(12) United States Patent
Reeve et al.

(10) Patent No.: US 6,761,824 B2
(45) Date of Patent: Jul. 13, 2004

(54) PROCESS FOR THE FRACTIONATION OF POLYMERS

(76) Inventors: Lorraine E. Reeve, 6192 Webster Church Rd., Dexter, MI (US) 48130; Michael G. Hinsberg, 4145 Vassar Dr., Troy, MI (US) 48085

(*) Notice: Subject to any disclaimer, the term of this patent is extended or adjusted under 35 U.S.C. 154(b) by 0 days.

(21) Appl. No.: 09/928,560

(22) Filed: Aug. 13, 2001

(65) Prior Publication Data

US 2002/0137973 A1 Sep. 26, 2002

Related U.S. Application Data

(60) Provisional application No. 60/225,917, filed on Aug. 17, 2001.

(51) Int. Cl.$^7$ .......................... B01D 11/04; C07C 37/72
(52) U.S. Cl. ....................... 210/639; 210/634; 568/621; 568/624
(58) Field of Search ............................. 210/634, 639; 568/621, 623, 624

(56) References Cited

U.S. PATENT DOCUMENTS

| | | | |
|---|---|---|---|
| 5,028,336 A | 7/1991 | Bartels et al. | 210/639 |
| 5,116,508 A | 5/1992 | Kumar et al. | 210/639 |
| 5,523,492 A | 6/1996 | Emanuele et al. | 568/624 |
| 5,567,859 A | 10/1996 | Emanuele et al. | 568/624 |
| 5,605,687 A | 2/1997 | Lee | 424/78.06 |
| 5,691,387 A | 11/1997 | Emanuele et al. | 514/723 |
| 5,696,298 A | 12/1997 | Emanuele et al. | 568/623 |
| 5,800,711 A | 9/1998 | Reeve et al. | 210/639 |
| 5,990,241 A | 11/1999 | Emanuele et al. | 525/88 |
| RE36,665 E | 4/2000 | Emanuele et al. | 568/624 |

FOREIGN PATENT DOCUMENTS

| | | | |
|---|---|---|---|
| WO | 9216484 | 10/1992 | 210/639 |
| WO | 9829459 | 7/1998 | 210/639 |
| WO | 9920683 | 4/1999 | 210/639 |
| WO | 0126692 | 4/2000 | 210/639 |
| WO | 0140321 | 6/2001 | 210/639 |

OTHER PUBLICATIONS

Englard, S., et al; (1990) Chapter 22: Precipitation Techniques. *Methods in Enzymology* 182, 285–300.
Hatti–Kaul, Rajni. (2000) Aqueous Two–Phase Systems, Methods and Protocols Humana Press.
King, T.P (1972) Separation of Proteins by Ammonium Sulfate Gradient Solubilization. *Biochemistry*, 11 (3), 367–371.
Kula, M.R., et al (1999) "Protein Purification, Aqueous Liquid Extraction", 2179–2191, in *Encyclopedia of Bioprocess Technology: Fermentation, Biocatalysis, and Bioseparation*, eds. Flickinger and Drew, John Wiley & Sons, Inc.
Reeve, LE. (1997) "The Poloxamers: Their Chemistry and Medical Applications", 231–249; in *Handbook of Biodegradable Polymers*, eds. Domb, Kost and Wiseman, Harwood Academic Publishers.
Rodriguez, F. (1989) "Principles of Polymer Systems" ($3^{rd}$ edition), Hemisphere Publishing Corp. Page. 154.
Tarli, P., et al (1974) Human Pituitary Growth Hormone: Solubility in Ammonium Sulfate Solutions. *Archives Biochemistry and Biophysics*, 161, 696–697.

*Primary Examiner*—Ernest G. Therkorn
(74) *Attorney, Agent, or Firm*—McDonnell Boehnen Hulbert & Berghoff (57) ABSTRACT

A process for the purification or fractionation of aqueous soluble polymers using an aqueous two-phase system is described. The concentrations of the polymer to be fractionated and of an aqueous soluble salt, and the temperature of the aqueous fractionation medium are adjusted so that two phases form, the lower molecular weight polymer molecules partition into the high salt concentration phase, and the higher molecular weight polymer molecules partition into the low salt concentration phase. The resulting high molecular weight polymers are characterized by a higher average molecular weight and a narrower molecular weight distribution and decreased unsaturation than the unfractionated polymers. After being subjected to the fractionation process, polyol polymers that form hydrogels in aqueous solution exhibited higher viscosities and a liquid to gel transition over a narrower temperature range than the unfractionated polyol polymers.

2 Claims, 7 Drawing Sheets

PROCESS FOR THE FRACTIONATION OF POLYMERS

This invention claims the priority of provisional application No. 60/225,917 filed on Aug. 17, 2001.

BACKGROUND

1. Field of Invention

This invention relates to a process for the fractionation of polymers that are aqueous soluble, and do not contain functional groups capable of carrying a charge at neutral pH.

2. Description of Prior Art

Many methods have been described for separating polymers of similar composition and structure. See for example U.S. Pat. Nos. 5,028,336, 5,116,508, 5,523,492, 5,567,859, 5,696,298, 5,800,711 and European Patent Application WO 92/16484, incorporated herein by reference. Also, various procedures have been described to fractionate proteins and peptides, but most include precipitation using ammonium sulfate (Englard and Seifter, 1990). This method relies on the fact that proteins, in an aqueous solution, maintain a tertiary structure based on their amino acid composition and various bonds within the molecule. The tertiary structure generally allows the hydrophobic substituents to be sequestered inside the molecule and the hydrophylic components to be on the surface, and in contact with the aqueous environment. Changes in the ionic strength of the aqueous solution cause unfolding of the molecule, and with exposure of the hydrophobic substituents to the aqueous environment, the solubility of the protein decreases and h precipitates. By carefully adjusting pH, ionic strength, and sometimes temperature, it is frequently possible to separate proteins with similar amino acid sequences (Englard and Seifter, 1990, King, 1972, Tarli and Li, 1974). Clearly, this method is useful only for proteins and other polymers composed of substituents that vary considerably in polarity, and therefore aqueous solubility. This is not the case for many synthetic polymers.

A method to separate water soluble organic electrolytes in an aqueous medium from other water soluble hydrocarbons has been disclosed (Bartels and Reale, 5,028,336). The pH of the aqueous medium is adjusted so that most of the organic electrolytes are charged. The aqueous medium is then passed through a filtration membrane which carries the same charge. The organic electrolytes are repelled by the charge on the membrane, and therefore do not cross. Water and uncharged organic molecules pass through the membrane and are thus separated from the organic electrolytes. This method is limited to organic molecules such as carboxylic acids which contain functional groups capable of carrying a charge at some pH.

Methods relying on supercritical fluid extraction have been developed to separate high molecular weight compounds, including polymers, from complex mixtures in aqueous solution (See for example Kumar and Hedrick, 5,116,508). This method requires a mobile phase of highly compressed gas, such as $CO_2$, at or above its critical temperature and pressure, to be pumped through the aqueous solution. The composition of the mobile phase can be modified to enhance extraction of the desired analyte. Such modifications include using a mixture of gases as the mobile phase, or adding a modifying chemical to the supercritical fluid. Such methods can be conducted on a commercial scale, and used to separate uncharged polymers including polyols. Nevertheless, to be effective, the compressed gases often must be maintained at high temperatures and pressures, which requires complex, well controlled equipment. This frequently makes supercritical fluid extraction an expensive process and limits its commercial applications.

Synthetic polyols such as poly(ethylene glycol) and polyoxyalkylene block copolymers have been used in various medical and pharmaceutical applications including treatment of sickle cell disease, reduction of blood viscosity, treatment of tissue ischemia, treatment of tissue following electrical injury, and drug delivery (Emanuele 5,691,387, Lee, R. C., 5,605,687, Reeve, L. E., 1997). These linear polymers are generally synthesized by repeated sequential reactions that add monomeric subunits to each end of the polymeric chain. Since subunits may add to either or both ends of individual chains at variable rates, the end product is a mixture of molecules varying in molecular weight.

The poly(ethylene glycol)s are composed entirely of ethylene oxide residues linked by ether linkages and vary considerably in molecular weight. These synthetic polymers have been used extensively in drug delivery to solubilize pharmaceutically active compounds. Recently, they have been used to derivatize proteins, peptides and small molecules to prolong half-life and enhance delivery within the body ( ). They have also been derivatized and used as cross-linking components in medical devices. For optimal safety and efficacy in medical applications, these recent uses require polymers of uniform molecular weight having minimal contamination with reaction byproducts.

The poloxamers are polyoxyalkylene block copolymers composed of two polyexyethylene blocks separated by a polyoxypropylene center block. The commercially available product contains a mixture of polyoxyethylene homopolymer, and polyoxyethylene/polyoxypropylene diblock polymers in addition to poloxamer molecules of varying molecular weights. These factors cause the polymer product to have a broad molecular weight range, reflected in a high polydispersity index. The mono- and diblock polymers are generally of a lower molecular weight than the average for the polymer product and contain some unsaturation. When commercially available poloxamers (purchased from BASF Corp.) were analyzed by gel permeation chromatography, a bimodal molecular weight distribution was observed (Reeve, L. E., 1997). The mono- and diblock contaminants, including the unsaturated species, partitioned into the lower molecular weight fraction.

European Patent Application WO 92/16484 discloses the use of gel permeation chromatography to isolate a fraction of poloxamer 188 that exhibits beneficial biological effects, without causing potentially deleterious side effects. The copolymer thus obtained had a polydispersity of 1.07 or less, and was substantially saturated. The potentially harmful side effects were shown to be associated with the low molecular weight, unsaturated portion of the polymer, while the medically beneficial effects resided in the uniform higher molecular weight material. Other similarly improved copolymers were obtained by purifying either the polyoxypropylene center block during synthesis of the copolymer, or the copolymer product itself (Emanuele 5,523,492, Emanuele 5,696,298). Although an effective means of purification, gel permeation chromatography is impractical for the preparation of large quantities of the fractionated polyoxyalkylene block copolymer.

A super critical fluid extraction technique has been used to fractionate a polyoxyalkylene block copolymer as disclosed in U.S. Pat. No. 5,567,859. A purified fraction was obtained, which was composed of a fairly uniform polyoxyalkylene block copolymer having a polydispersity of less than 1.17. According to this method, the lower molecular weight fraction was removed in a stream of $CO_2$ maintained at a pressure of 2200 pounds per square inch (psi) and a temperature of 40° C. As is frequently the case, this super critical fluid extraction method required equipment that can control temperature and accommodate compressed $CO_2$ at high pressure. Clearly, these requirements add expense to the procedure and limit its commercial value.

U.S. Pat. No. 5,800,711 discloses a process for the fractionation of polyoxyalkylene block copolymers by the batchwise removal of low molecular weight species using a salt extraction and liquid phase separation technique. Poloxamer 407 and poloxamer 188 were fractionated by this method. In each case, a copolymer fraction was obtained which had a higher average molecular weight and a lower polydispersity index as compared to the starting material. However, the changes in polydispersity index were modest and analysis by gel permeation chromatography indicated that some low molecular weight material remained. The viscosity of aqueous solutions of the fractionated polymers was significantly greater than the viscosity of the commercially available polymers at temperatures between 10° C. and 37°C., an important property for some medical and drug delivery applications. Nevertheless, some of the low molecular weight contaminants of these polymers are thought to cause deleterious side effects when used inside the body, making it especially important that they be removed in the fractionation process. As a consequence, polyoxyalkylene block copolymers fractionated by this process are not appropriate for some medical uses.

Aqueous two phase systems have been used extensively to concentrate or isolate polymers, other large molecules, and even particles from complex mixtures (Hatti-Kaul, R., 2000). Such systems generally avoid the use of organic solvents, and extremes of pH or temperature, and, because of their mild conditions, have been shown to be especially useful to isolate amino acids, peptides, proteins, plasma membranes including membrane vesicles, and viruses. These systems are composed of either hydrophilic polymer pairs or a polymer and a salt that are incompatible in aqueous solution and form two phases in equilibrium with each other. Separations can be carried out using either batch procedures or counter-current distribution. Although widely used for the isolation and purification of biomaterials, aqueous two-phase systems have been used much less extensively for the isolation or fractionation of synthetic polymers.

SUMMARY

The present invention is a method for the fractionation of water-soluble synthetic polymers by physically separating the lower molecular weight polymer molecules, byproducts, and contaminants from the desired polymer by using an aqueous two-phase system.

OBJECTIVES AND ADVANTAGES

The present invention provides a process for the fractionation of aqueous soluble polymers comprising dissolving a known amount of the polymer in water, adding a soluble extraction salt to the polymer solution, maintaining the solution at a constant optimal temperature for a period of time adequate for two distinct phases to appear, and physically separating the phases. Additionally, the phase containing the polymer fraction of the preferred molecular weight may be diluted to the original volume with water, extraction salt added to achieve the original concentration, and the separation process repeated as needed until a polymer having a narrower molecular weight distribution than the starting material and optimal physical characteristics can be recovered.

It is an object of the present invention to provide a method that separates lower molecular weight polyol polymer molecules from those of very similar chemical composition but higher molecular weight thereby narrowing the molecular weight distribution.

It is another object of the present invention to provide a method to remove reaction byproducts from the polyol polymer.

Another object of the present invention is to provide an improved method which produces a polyol polymer with improved chemical and physical characteristics including decreased polydispersity, decreased unsaturation, higher viscosity in aqueous solution, and hence increased gel strength, and a well defined transition temperature for those polyols that form gels in solution.

DESCRIPTION OF THE PREFERRED EMBODIMENTS

Although molecular weight averages are informative when comparing polymers, it is also useful to know the molecular weight distribution of each polymer. The polydispersity index of a polymer is a universally accepted measure of the breadth of the molecular weight distribution and is defined as follows:

Number Average Molecular Weight ($M_n$):

$$M_n = \frac{\text{Sum of } (W_t) \text{ for all } t \text{ Values}}{\text{Sum of } (W/M)}$$

Weight Average Molecular Weight ($M_w$):

$$M_n = \frac{\text{Sum of } [(W_t)(M_t)] \text{ for all } t \text{ Values}}{\text{Sum of } (W_t) \text{ for all } t \text{ Values}}$$

Polydispersity Index (D):

$$(D) = \frac{M_n}{M_w}$$

where $W_i$ is the mass of the i-th polymer species and $M_i$ is the molecular weight of the i-th species. A low, polydispersity value, D, indicates a narrow molecular weight distribution. In a monodisperse population where all molecules are identical, $M_w$ would be equal to $M_n$ and the polydispersity index would be equal to 1.0. Typical polymer preparations have polydispersity index values between 1.5 and 5, but some may be much higher.

A variety of procedures is available for determining molecular weight including gel permeation chromatography or other chromatographic techniques, viscosity related measurements, light scattering, osmotic pressure, ultra centrifugation and chemical methods involving end group analysis. For most polymers molecular weight distribution parameters including $M_w$, $M_n$, and D, are conveniently measured using gel permeation chromatography.

The viscosity of a fluid is a measure of friction that results when one layer of the fluid to moves in relation to another layer in response to a shearing force. The terms shear stress ($\tau$) and rate of shear ($\gamma$) are used to indicate the applied force and the response of the fluid (Rodriguez, 1989). Shear viscosity is defined as:

$\tau$=shear stress=$f/A$

$\gamma$=rate of shear=$u/y$ $\eta$=shear viscosity=$\tau/\gamma$ where f/A is the force per unit of area required to maintain a constant velocity gradient, u/y. Viscosity is expressed as Pascal(seconds), or centipoise (cps), where 1000 cps equals 1 Pascal(second).

The process of the present invention separates lower molecular weight polymer molecules and byproducts from high molecular weight polyol polymer molecules. The process consists of forming an aqueous two-phase system composed of the polymer and an appropriate salt in water. In such a system, a soluble salt can be added to a single phase polymer-water system to induce phase separation to yield a high salt, low polymer bottom phase, and a low salt, high polymer upper phase. Under carefully selected conditions lower molecular weight polymers partition preferentially into the high salt, low polymer phase. Polymers that can be fractionated using this process include polyethers, glycols such as poly(ethylene glycol) and poly(ethylene oxide)s, polyoxyalkylene block copolymers such as poloxamers, poloxamines, and polyoxypropylene/polyoxybutylene copolymers, and other polyols such as polyvinyl alcohol. The average molecular weight of these polymers may range from about 800 to greater than 100,000 daltons.

The poloxamers are a series of block copolymers having the general structure:

The average molecular weights of the poloxamers range from about 1,000 to greater than 16,000 daltons. Because the ploxamers are products of a sequential series of reactions, the molecular weights of the individual poloxamer molecules form a statistical distribution about the average molecular weight. In addition, commercially available poloxamers contain substantial amounts of poly (oxyethylene) homopolymer and poly(oxyethylene)/poly (oxypropylene diblock polymers. The relative amounts of these byproducts increase as the molecular weights of the component blocks of the poloxamer increase.

Depending upon the manufacturer, these byproducts may constitute from about 15 to about 50% of the total mass of the polymer. The process of the present invention exploits the differences in size and polarity, and therefore solubility, among the poloxamer molecules, the poly(oxyethylene) homopolymer and the poly(oxyethylene)/poly (oxypropylene) diblock byproducts. The polar fraction of the poloxamer, which generally includes the lower molecular weight fraction and the byproducts, is removed allowing the higher molecular weight fraction of poloxamer to be recovered. The larger molecular weight poloxamer recovered by this method has physical characteristics substantially different from the starting material or commercially available poloxamer including a higher average molecular weight, lower polydispersity and a higher viscosity in aqueous solution.

Figure 4A:
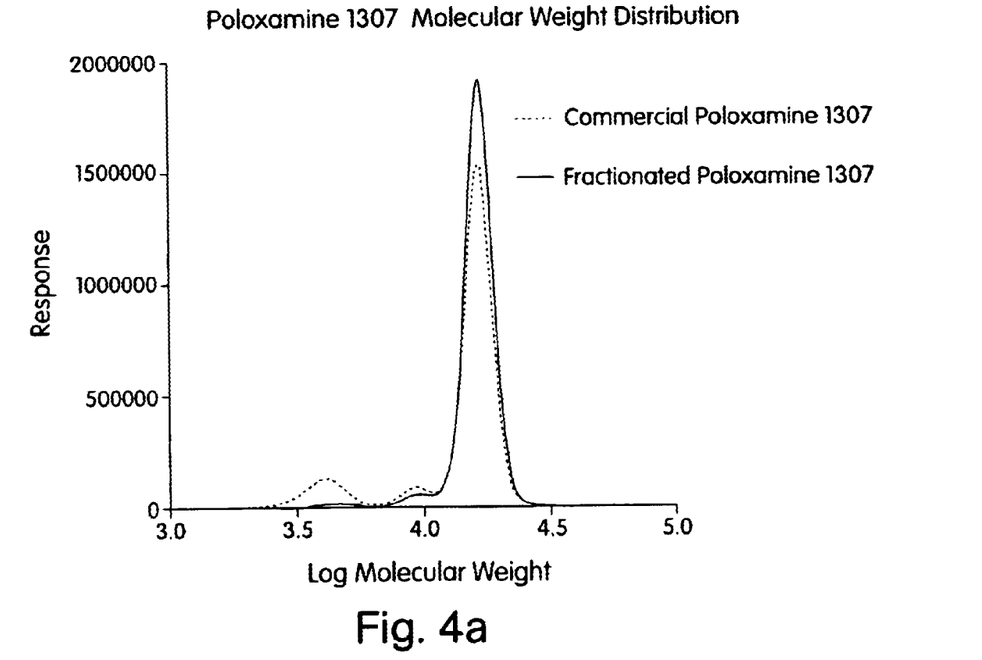
FIG. 4a is a chromatogram of poloxamine 1307 showing the molecular weight distribution of the polymer before and after fractionation using the method of the present invention. The chromatographic system described for FIG. 1 was used.

The poloxamines are tetra-functional block copolymers synthesized by the sequential addition of first, propylene oxide, and then ethylene oxide to the tertiary nitrogens of ethylenediamine. The poloxamines have the following general structure:

Like the poloxamers, the poloxamines are composed of molecules that vary considerably in molecular weight. When subjected to gel permeation chromatography, commercially available poloxamine (Tetronic® 1307 purchased from BASF Corp., Mount Olive, N.J.) eluted as three separate peaks (FIG. 4a). The process of the present invention removed much of the lower molecular weight material, producing a polymer with a slightly higher average molecular weight and more uniform size compared to the starting material. In addition, the viscosities of aqueous solutions of the fractionated polymer were considerably higher than those of the commercially available material.

Because they are composed of hydrophobic poly (oxypropylene) blocks and hydrophilic poly(oxyethylene) blocks, both poloxamers and poloxamines form micelles in aqueous solutions. If the concentration of the polymer is sufficient, the micelles aggregate in a characteristic, temperature dependent fashion, and cause the solution to become a hydrogel. Such hydrogels have been used in various medical applications including site specific drug delivery and manipulation of tissue during and after surgery (Reeve, 1997). Of particular interest are poloxamer 407 and poloxamine 1307 because, for these polymers, the transition from liquid to gel takes place below 37° C. Therefore, in medical applications, a formulation containing these polymers can be applied to the human body as a liquid at or below room temperature that will coat and adhere to tissues, but will rapidly form a gel as it equilibrates to body temperature, and remain where it is placed. However, for both commercially available poloxamer 407 and poloxamine 1307, gelation occurs over a fairly broad temperature range of ten to twenty degrees Celsius. For fractionated polymers recovered from the process of the present invention, in contrast, the transition from liquid to gel occurred in a much narrower, well defined temperature range of approximately two to five degrees Celsius. In addition, the viscosities of gels of various concentrations of either fractionated polymer were higher above 30° C. These two characteristics of the fractionated polymers, rapid transition from liquid to gel over a narrow temperature range, and higher viscosity at body temperature, provide an improved gel for medical applications. Lower concentrations of the fractionated polymer can be used to provide a reliable formulation that will rapidly become a gel at a well defined temperature, but with reduced exposure to the polymer for the patient.

Figure 1:
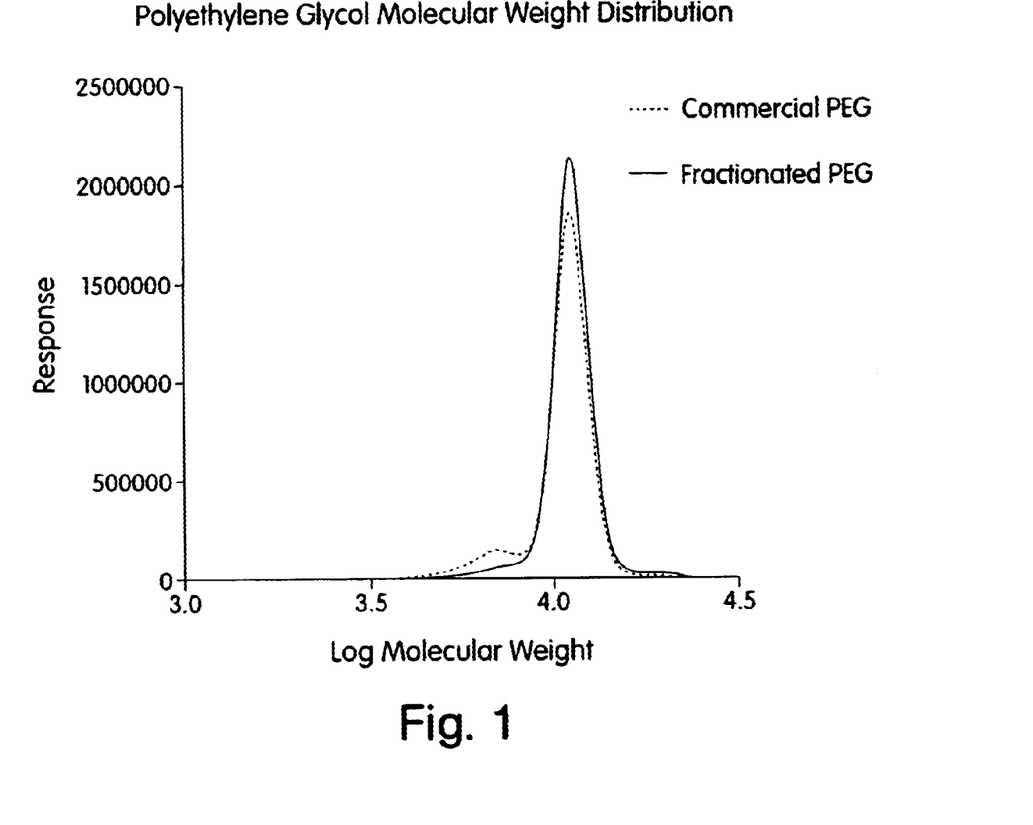
FIG. 1 is a chromatogram of poly(ethylene glycol) showing the molecular weight distribution of the polymer before and after fractionation using the method of the present invention. The chromatogram was obtained by gel permeation chromatography using two 7.8 mm×25 cm columns packed with styrene/divinyl benzene copolymer gel (100 μm pore size) eluted with a solvent composed of 98:2 tetrahydrofuran/triethylamine and a refractive index detector.
Figure 2A:
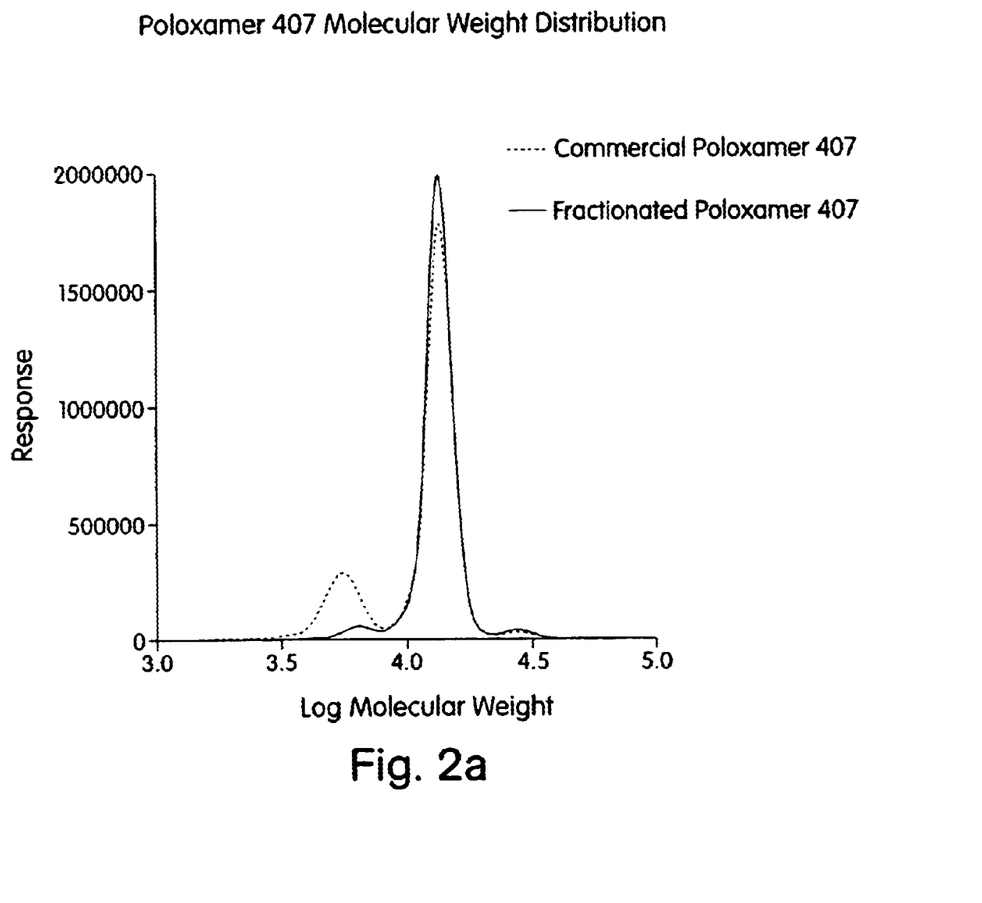
FIG. 2a is a chromatogram of poloxamer 407 showing the molecular weight distribution of the polymer before and after fractionation using the method of the present invention. The same chromatographic system described for FIG. 1 was used.
Figure 2B:
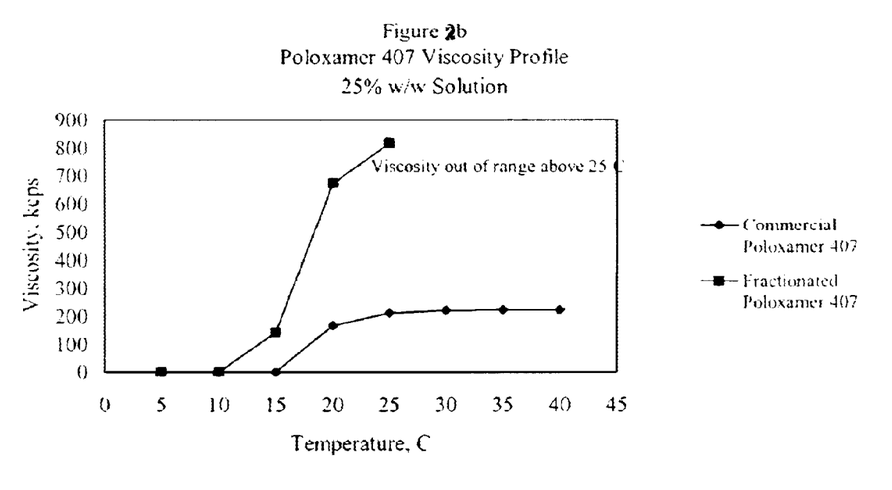
FIG. 2b is a comparison of the viscosities of a 25% solution of commercially available poloxamer 407 and fractionated poloxamer 407 obtained from the method of the present invention. Viscosities were measured over a temperature range of about 0° C. to about 45° C.

The commercially available poly(ethylene glycol)s and poly(ethylene oxide)s are polymers composed of ethylene oxide monomers held together by ether linkages. The poly(ethylene glycols) vary from several hundred to approximately 20,000 average molecular weight. The molecular weights of the poly(ethylene oxide)s range from above 20,000 to several million. Like the polyoxyalkylenes, these polymers are synthesized by the repeated addition of monomers to the ends of the growing polymer chain, and therefore, are composed of molecules varying in molecular weight, and include some relatively low molecular weight material (FIG. 1). The process of the present invention was found to remove the lower molecular weight material yielding a more uniform product. The poly(ethylene glycol)s have been used in aqueous two phase systems as the "incompatible" polymer to concentrate and isolate biopolymers. However, the poly(ethylene glycol)s, themselves have not been fractionated or purified by such methods.

The process of the present invention comprises the following steps:

1. A known amount of the polyol polymer to be fractionated is dissolved in water at an appropriate concentration.
2. The mixture is equilibrated to about 0 to 5° C., then a soluble extraction salt is added slowly with vigorous mixing until the solution becomes opaque. Soluble salts may include salts of sulfate, phosphate and citrate. The preferred salts are sulfates, such as ammonium sulfate $((NH_4)_2SO_4)$. Dextran and starch may also be used.
3. The solution is allowed to equilibrate at between 0 and 5° C. until two distinct phases, upper and lower, appear (usually between about 2 and about 8 hours). Centrifugation may be used to expedite phase separation.
4. The lower layer is removed. The upper layer is diluted to its original volume by the addition of deionized water.
5. Steps 2,3, and 4 are repeated from about 2 to about 5 times depending upon the polyol polymer used as the starting material, the contaminating byproducts and the degree of fractionation required.
6. After the final extraction, the upper layer containing the fractionate of the polyol polymer may the isolated and/or concentrated by extraction into dichloromethane, chloroform or any other suitable organic solvent or solvent mixture, or by dialysis. If organic extraction is used, the extract may be dried using a suitable agent such as anhydrous sodium sulfate.
7. Residual solvent(s) can be removed by vacuum or lyophilization.
8. The higher molecular weight fraction of the polyol polymer is the dried residue obtained after removal of the solvent.

In the case of the poloxamers and the poloxamines, the fractionated polymer has a reduced polydispersity index, reduced unsaturation and increased viscosity in aqueous solution compared to the starting material which allows for better functionality for various medical and pharmaceutical applications. In the case of poly(ethylene glycol), the fractionated polymer has a higher average molecular weight and a narrower molecular weight distribution than the starting material as indicated by a lower polydispersity index.

The following examples illustrate the fractionation process.

Example 1

Poly(ethylene glycol) (lot number 15628B0) (mwt 10,000) purchased from Aldrich Chemical Corp., Milwaukee, Wis., was weighed and 0.45 grams were dissolved in 15 grams of deionized water. The solution was maintained at 1.5° C. and 2.51 g of $(NH_4)_2SO_4$ were added slowly until the solution turned opaque. Solution was maintained at 2° C., and after two phases formed, the lower phase was removed. Deionized water (13.2 g) was added and the solution was equilibrated at approximately 1° C. Next, $(NH_4)_2SO_4$ (2.3 g) was added with stirring until the solution turned opaque. The solution was maintained at approximately 2° C. until two phases separated. The lower phase was removed, 12.9 g of deionized water was added, the solution was chilled to 1.3° C., and 2.4 g $(NH_4)_2SO_4$ were added. The solution was maintained at approximately 2° C. until two phases separated. The upper phase was isolated, washed into a separatory funnel with 30 ml of deionized water and extracted three times with 10 ml dichloromethane. The dichloromethane extracts were combined, and the solvent was removed under vacuum at 20° C. The fractionated polyethylene glycol (0.11 g) was recovered, and found to have an average molecular weight of 11.168 compared to 10.588 for the commercially available poly(ethylene glycol) starting material and a polydispersity index of 1.028 compared to 1.059 for the starting material.

Example 2

Poloxamer 407 (lot number WPHT-543B), purchased from BASF Corporation, Mount Olive, N.J., was weighed and 486.0 g were dissolved in 15,733 g of deionized water. The solution was maintained at 0.1° C. and 2335.1 g of $(NH_4)_2SO_4$ were added. The solution was equilibrated at 2° C. and after two distinct phases formed, the lower phase was discarded, and the upper phase (2060 g) was collected and weighed. Deionized water (14159 g) was added and the solution was equilibrated to 2° C. Next, 2171.6 g of $(NH_4)_2SO_4$ were added with stirring. After the salt was dissolved, the solution was maintained at approximately 2° C. until two phases formed. The upper phase (3340 g) was isolated and diluted with 12879 g of deionized water. The solution was chilled to about 2.2° C. and 2062 g of $(NH_4)_2SO_4$ were added. The phases were allowed to separate as above. The upper phase was isolated and extracted with 4 liters of dichloromethane. Two phases were allowed to form overnight. The organic (lower) phase was isolated and approximately 2 kg of sodium sulfate ($Na_2SO_4$) were added to it to remove the remaining water. The dichloromethane phase was filtered through a PTFE filter (0.45 μm pore size) to remove the undissolved salts. The dichloromethane was removed under vacuum at approximately 30° C. Final traces of dichloromethane were removed by drying in an oven overnight at about 30° C. A total of 297.6 g of fractionated poloxamer 407 (lot number 00115001) were recovered. The chemical and physical characteristics of the fractionated poloxamer 407 are compared to those of the starting material in Table 1.

TABLE 1

| Sample | $M_w$ | $M_n$ | $M_w/M_n$ | Unsaturation mEq/g | Weight % oxyethylene | Viscosity, centipoise* |
|---|---|---|---|---|---|---|
| Poloxamer 407 | 11,996 | 9,979 | 1.20 | 0.048 | 73.2 | 215,000 |
| Poloxamer 407, lot 00115001, fractionated | 13,551 | 12,715 | 1.06 | 0.005 | 69.3 | >820,000 |

*Viscosity of a 25% solution measured at 30° C. using a cone and plate viscometer Example 3

Poloxamer 188 (BASF Corp. Lot# WPMO-568B) was weighed and 4.5 g were, dissolved in 145.5 g of deionized water. The solution was cooled to 2° C. and 26.0 g of ($NH_4$)$_2SO_4$ were added and dissolved with stirring. The solution was maintained at approximately 2° C. until the phases separated. After two phases formed, the lower phase was discarded, and the upper phase was diluted with 125.4 g with deionized water. The solution was cooled to 0.3° C. and 20.7 g of ($NH_4$)$_2SO_4$ were added slowly with stirring until the solution turned opaque. The solution was maintained at 3° C. until two phases formed. After the phases separated, the upper phase was isolated and diluted with 125.4 g with deionized water, chilled to −0.4° C. and 21.9 g of ($NH_4$)$_2SO_4$ were added to the solution and dissolved with stirring. The solution turned opaque, and was then maintained at 3° C. until two clear phases formed. The lower phase was removed, and the upper phase was diluted with 25 ml deionized water. The diluted solution was then extracted three times with 15 ml portions of dichloromethane. The dichloromethane extracts were combined and washed two times with 25 ml portions of deionized water. The water extracts were discarded. The dichloromethane extract was first dried by filtering through anhydrous $Na_2SO$, and then the solvent was removed under vacuum at 30° C. The remaining solid material was the fractionated poloxamer 188. The fractionated poloxamer 188 was weighed (1.35 g), assigned the lot number 01199001, and its physical properties were evaluated.

Figure 3A:
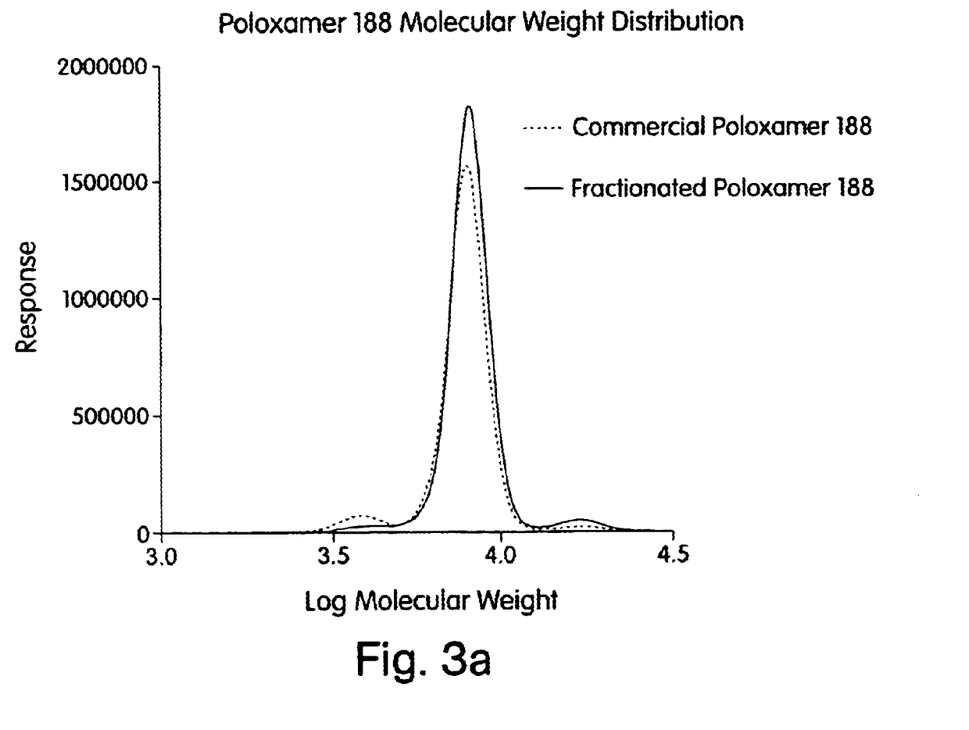
FIG. 3a is a chromatogram of poloxamer 188 showing the molecular weight distribution of the polymer before and after fractionation using the method of the present invention. The chromatographic system described in FIG. 1 was used.
Figure 3B:
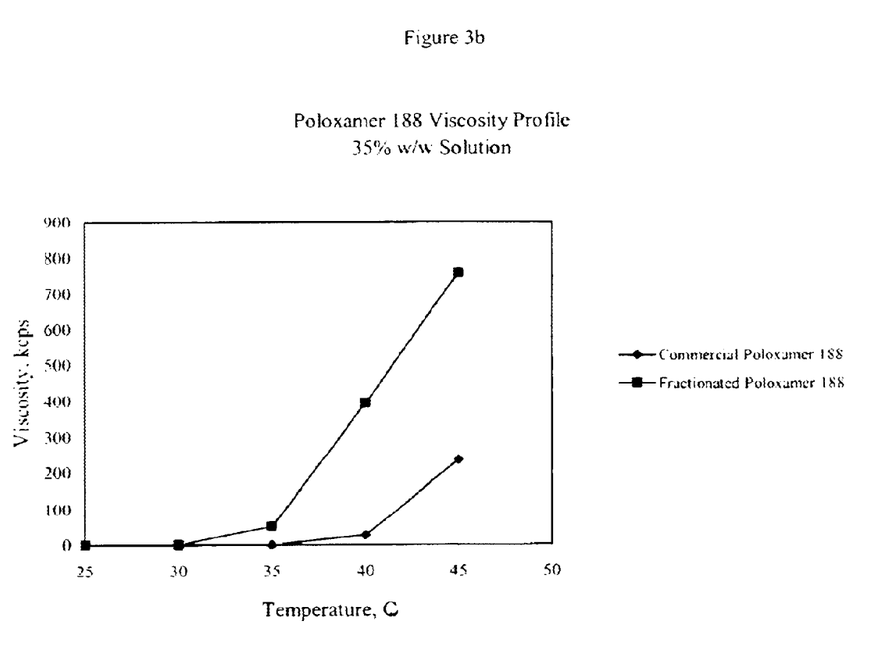
FIG. 3b is a comparison of the viscosities of a 35% aqueous solution of commercially available poloxamer 188 and fractionated poloxamer 188 obtained from the method of the present invention.

Both the very high and very low molecular weight material was removed from the fractionated poloxamer 188 (FIG. 3a) and the polydispersity was reduced from 1.062 for the unfractionated poloxamer 188 to 1.041. The average molecular weight increased from 7,802 to 8,212. The viscosity of a 35% w/w aqueous solution of fractionated poloxamer 188 began to increase above 35° C., and formed a gel at (and above) 40° C. In contrast, a 35% solution of commercially available poloxamer 188 exhibited an increase in viscosity only above 40° C., and formed a weak gel at approximately 45° C. (FIG. 3b).

Example 4

Poloxamine 1307 (BASF Corp, Mount Olive, N.J., Tetronic 1307 Lot No. WPET-587B) was weighed and 0.45 g were dissolved in 15 g deionized water with stirring. The solution was chilled to 1.5° C., and 2.28 g ($NH_4$)$_2SO_4$ were slowly added. The solution was maintained at 2° C. until two phases formed. The lower phase was removed, 12.8 g of deionized water were added, and the solution was cooled to 0.6° C. Next, 2.0 g ($NH_4$)$_2SO_4$ were added slowly with stirring. The solution was then maintained at 2° C. without stirring until two phases formed. The lower phase was removed, 12.7 g of deionized water were added, and the solution was cooled to 1.4° C. ($NH_4$)$_2SO_4$ (2.1 g) was added slowly, with stirring until the solution turned opaque. The solution was maintained at 2° C. until two phases formed.

The upper phase was isolated and transferred to a separatory funnel with the addition of 30 ml of deionized water. The upper phase was then extracted three times with 10 ml dichloromethane. The dichloromethane extracts were combined, and the solvent was removed under vacuum at 20° C. The resulting solid material (0.19 g) was the fractionated poloxamine.

Figure 4B:
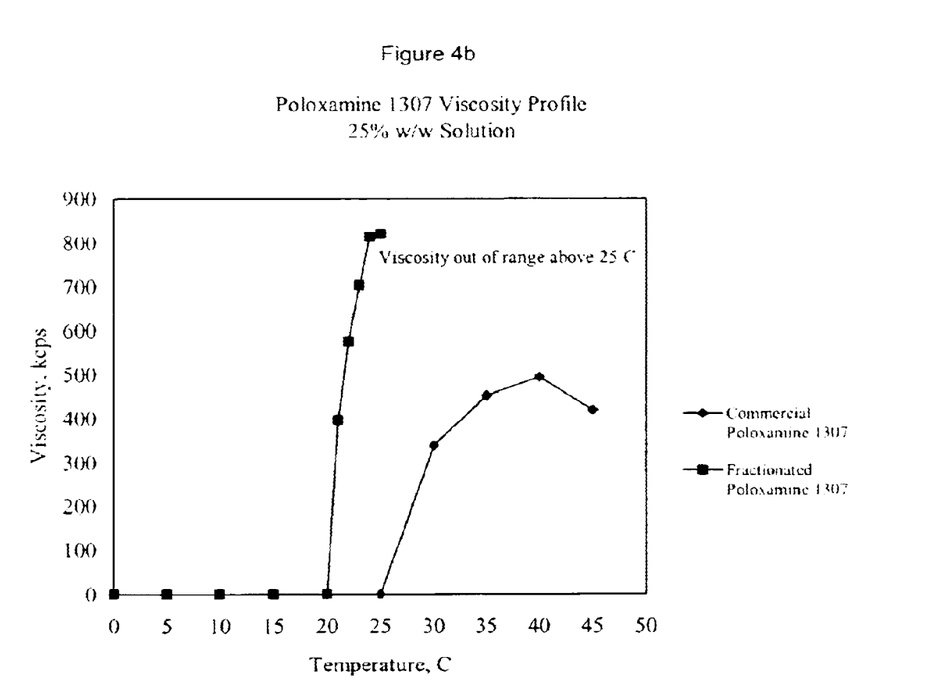
FIG. 4b is a comparison of the viscosities 25% aqueous solution of commercially available poloxamine 1307 and fractionated poloxamine 1307 obtained from the method of the present invention. The viscosities of each solution were measured over a temperature range of about 0° C. to about 50° C.

The average molecular weight of the fractionated polymer was 16,217 and the polydispersity was 1.064, compared to an average molecular weight of 14,409 and a polydispersity index of 1.316 for the commercial poloxamine, Tetronic® 1307. A 25% solution of fractionated poloxamine 1307 changed from a liquid to a very stiff gel (viscosity greater than 800 kcps) between 20 and 24° C. In contrast the viscosity of a 25% solution of commercially available poloxamine 1307 began to increase only above 25° C., and formed a non-flowable gel at (and above) 30° C. The maximum viscosity was 494 kcps, and occurred at 40° C. (FIG. 4b).

These examples should not be construed as limiting the scope of the invention, but as merely providing illustrations of some of the presently preferred embodiments to this invention.

We claim:

1. A method for the fractionation of polyoxyalkylene block copolymers comprising:

a. dissolving up to about 10% by weight of polyoxyalkylene block copolymer in water to form a solution of a known concentration of polyoxyalkylene block copolymer;

b. adjusting to a preselected temperature of between −5° C. and −30° C. the temperature of the solution of step a;

c. dissolving about 5 to about 25% by weight of ammonium sulfate in the solution of step a at the preselected temperature to provide a known concentration of ammonium sulfate in the solution;

d. allowing the aqueous solution to form a high salt phase and a low salt phase at the preselected temperature, wherein the concentration of polyoxyalkylene block copolymer, the concentration of ammonium sulfate, and the extraction temperature are chosen so that the lower molecular weight polyoxyalkylene block copolymer molecules partition into the high salt concentration phase and the higher molecular weight polyoxyalkylene molecules partition into the low salt concentration phase of the aqueous solution.

2. The method of claim 1, wherein the extraction temperature is from about −2° C. to about 10° C.

\* \* \* \* \*

UNITED STATES PATENT AND TRADEMARK OFFICE
CERTIFICATE OF CORRECTION

| | | |
|---|---|---|
| PATENT NO. | : 6,761,824 B2 | Page 1 of 1 |
| APPLICATION NO. | : 09/928560 | |
| DATED | : July 13, 2004 | |
| INVENTOR(S) | : Reeve et al. | |

It is certified that error appears in the above-identified patent and that said Letters Patent is hereby corrected as shown below:

On the TITLE page, ITEM 60, "Related U.S. Application Data", replace "2001" with -- 2000 --.

At column 1, line 5, replace "2001" with -- 2000 --.

Signed and Sealed this

Twenty-ninth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 6,761,824 B2 Page 1 of 1
APPLICATION NO. : 09/928560
DATED : July 13, 2004
INVENTOR(S) : L. E. Reeve et al.

It is certified that error appears in the above-identified patent and that said Letters Patent is hereby corrected as shown below:

Col. 10, in claim 1, at line 48, replace "-30° C." with --30° C--.

Signed and Sealed this

Second Day of December, 2008

JON W. DUDAS
*Director of the United States Patent and Trademark Office*